US009443135B2

(12) United States Patent
Matsumoto et al.

(10) Patent No.: US 9,443,135 B2
(45) Date of Patent: Sep. 13, 2016

(54) PERSON COUNTING DEVICE, PERSON COUNTING SYSTEM, AND PERSON COUNTING METHOD

(71) Applicant: PANASONIC INTELLECTUAL PROPERTY MANAGEMENT CO., LTD., Osaka (JP)

(72) Inventors: Yuichi Matsumoto, Kanagawa (JP); Daisuke Ueta, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/666,766

(22) Filed: Mar. 24, 2015

(65) Prior Publication Data
US 2015/0278588 A1    Oct. 1, 2015

(30) Foreign Application Priority Data

Mar. 26, 2014    (JP) .................................. 2014-063544

(51) Int. Cl.
G06K 9/00         (2006.01)
G06Q 30/02        (2012.01)
G06T 7/20         (2006.01)

(52) U.S. Cl.
CPC ....... *G06K 9/00348* (2013.01); *G06K 9/00778* (2013.01); *G06Q 30/0201* (2013.01); *G06T 7/20* (2013.01); *G06T 2207/20076* (2013.01); *G06T 2207/20081* (2013.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS 8,320,624 B2 * 11/2012 Takahata ............ G06K 9/00295
348/169
9,025,875 B2 *  5/2015 Matsumoto ........ G06K 9/00369
382/173

(Continued)

FOREIGN PATENT DOCUMENTS

JP    2004-185363      7/2004
JP    2005-148863 A    6/2005

(Continued)

OTHER PUBLICATIONS

Japan Office action, mail date is May 12, 2015.

(Continued)

*Primary Examiner* — Avinash Yentrapati
(74) *Attorney, Agent, or Firm* — Greenblum & Bernstein, P.L.C.

(57) ABSTRACT

A person counting device is provided to count the number of persons passing through a counting area set in a monitoring area, and includes: a counting condition setter that sets a non-walkable area and the counting area; a traffic line acquirer that acquires a traffic line for each person; a passing-person counter that counts the number of persons passing through the counting area based on the traffic line; a traffic line determinator that determines whether or not the traffic line passes through the non-walkable area; a correction area selector that estimates the counting area existing on an avoidance route that does not pass through the non-walkable area based on the state of the traffic line, and selects the counting area as a correction target; and a passing-person counting corrector that corrects the number of passing persons with regard to the counting area selected as the correction target.

12 Claims, 13 Drawing Sheets

(56) References Cited

U.S. PATENT DOCUMENTS

| | | | |
|---|---|---|---|
| 2007/0086622 A1* | 4/2007 | Sun | G06K 9/32 382/103 |
| 2009/0003653 A1* | 1/2009 | Takahata | G06T 7/2093 382/103 |
| 2009/0164284 A1* | 6/2009 | Koiso | G06K 9/00335 705/7.29 |
| 2009/0296985 A1* | 12/2009 | Lv | G06T 7/2086 382/103 |
| 2012/0147144 A1* | 6/2012 | Takahata | G06T 7/2093 348/46 |
| 2013/0027561 A1 | 1/2013 | Lee et al. | |
| 2013/0030875 A1 | 1/2013 | Lee et al. | |
| 2013/0230245 A1* | 9/2013 | Matsumoto | G06K 9/00369 382/173 |
| 2014/0037147 A1* | 2/2014 | Yoshio | G06T 7/0081 382/107 |
| 2015/0120237 A1* | 4/2015 | Gouda | G06T 7/2006 702/150 |
| 2015/0208043 A1* | 7/2015 | Lee | G06Q 30/02 348/150 |

FOREIGN PATENT DOCUMENTS

| | | |
|---|---|---|
| JP | 4408916 B2 | 1/2009 |
| JP | 2012-159958 | 8/2012 |
| JP | 2013-186556 | 9/2013 |
| WO | 2004/029546 | 4/2004 |

OTHER PUBLICATIONS

U.S. Appl. No. 14/680,464 to Takeshi Watanabe et al., which was filed on Apr. 7, 2015.

U.S. Appl. No. 14/717,198 to Daisuke Ueta et al., which was filed on May 20, 2015.

U.S. Appl. No. 14/668,047 to Yuichi Matsumoto et al., which was filed on Mar. 25, 2015.

* cited by examiner

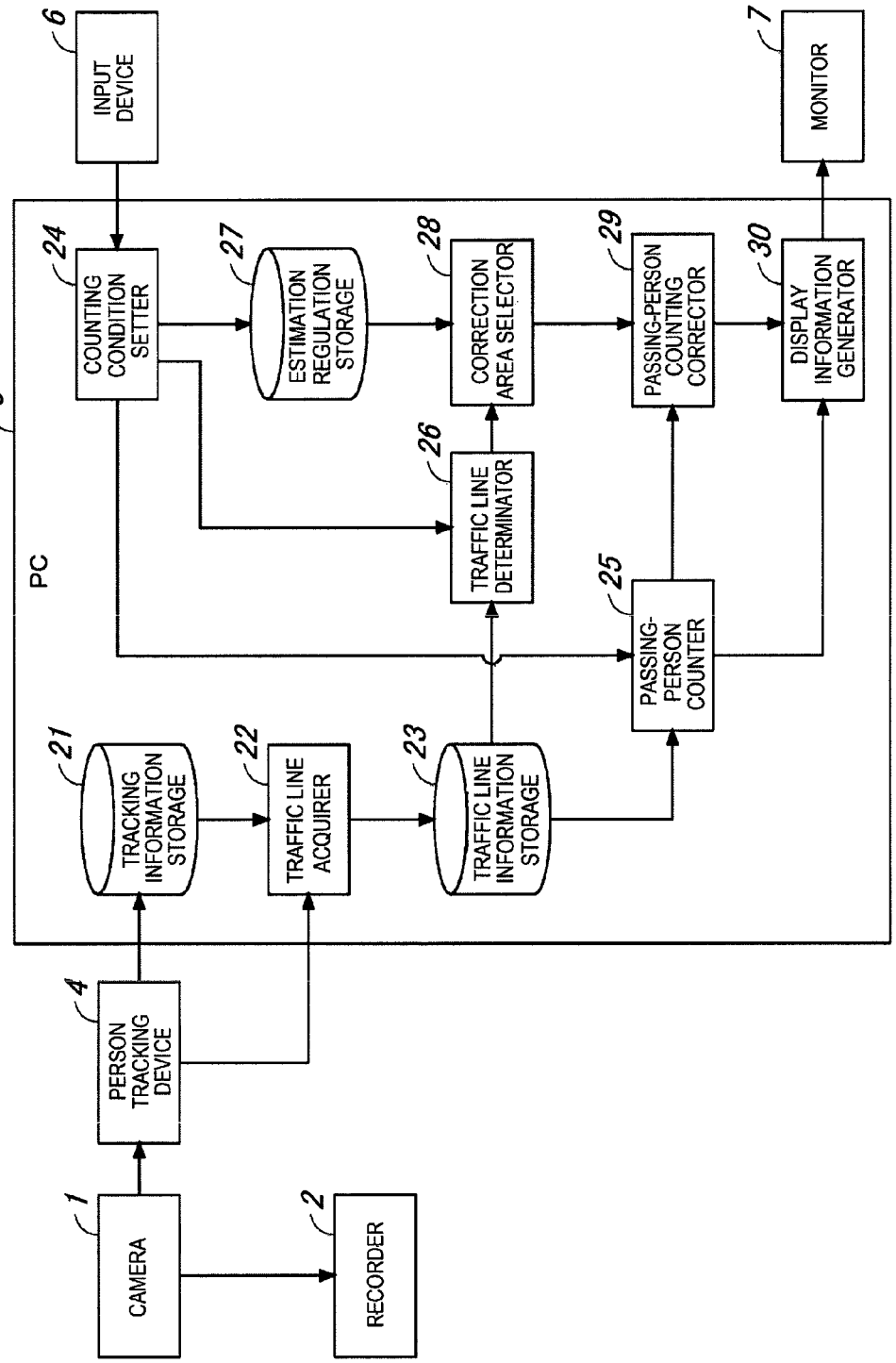

FIG. 8

| START POINT AREA | END POINT AREA | START POINT AREA MOVING DIRECTION | END POINT AREA MOVING DIRECTION | CORRECTION AREA |
|---|---|---|---|---|
| ... | ... | ... | ... | ... |
| ... | ... | ... | ... | ... |
| A2 | A5 | LEFT | RIGHT | A1,A4 |
| A2 | A5 | RIGHT | LEFT | A6,A7 |
| ... | ... | ... | ... | ... |
| ... | ... | ... | ... | ... |

FIG. 9

| START POINT AREA | END POINT AREA | START POINT AREA MOVING DIRECTION | END POINT AREA MOVING DIRECTION | ELAPSED TIME | CORRECTION AREA |
|---|---|---|---|---|---|
| ... | ... | ... | ... | ... | ... |
| ... | ... | ... | ... | ... | ... |
| A2 | A5 | LEFT | RIGHT | SHORTER THAN 10 SEC | A1,A4 |
| A2 | A5 | LEFT | RIGHT | EQUAL TO OR LONGER THAN 10 SEC | A1,A8,A4 |
| ... | ... | ... | ... | ... | ... |
| ... | ... | ... | ... | ... | ... |

PERSON COUNTING DEVICE, PERSON COUNTING SYSTEM, AND PERSON COUNTING METHOD

BACKGROUND OF THE INVENTION

1. Field of the Invention

The present invention relates to a person counting device, a person counting system, and a person counting method that counts the number of persons passing a counting area set in a monitoring area using an image obtained by imaging the monitoring area.

2. Description of the Related Art

In a store such as a convenience store, a monitoring camera system that monitors a person in the store using an image imaged by a camera installed in the store is widely spread. However, if the number of persons passing a counting area set in the store is counted using an image imaged by the camera, a degree of customer interest with respect to a display shelf of products of interest can be checked by setting the counting area on a path in front of the display shelf of the products of interest. In this way, an improved way of displaying the products can be considered, and thus, it is possible to improve the sales and profits of the store.

As a device related to the counting of the number of passing persons in the store, a technology is known in the related art, in which a detection line is set on the image of the camera which images the monitoring area, and the number of persons crossing the detection line is counted (refer to Japanese Patent Unexamined Publication No. 2005-148863). In a case of an image obtained by imaging the monitoring area by a camera having a predetermined angle of view, so-called a box camera from an oblique direction, there is a problem of an erroneous counting occurring. In contrast, in this technology, since the counting is performed considering the movement direction of the persons, the accuracy of counting the number of passing persons can be improved.

In addition, a technology is known, in which, when the monitoring area is divided into a walkable area (effective area) and a non-walkable area (non-effective area) and in a case where a traffic line acquired by tracking the person is crossing the non-walkable area, such an abnormal portion in the traffic line which passes through a non-walkable area is eliminated (refer to Japanese Patent No. 4408916). In this technology, a normal traffic line remains in the divided state by eliminating the abnormal portion of the traffic line, and an editing operation for restoring the complete traffic line is performed by an operator's visual operation with respect to only the normal traffic line. Thus, the highly accurate traffic line can be acquired.

In counting the number of persons passing through the counting area, the traffic line for each person is acquired and then, the traffic lines passing through the counting area can be counted. However, in a case where there is an abnormal traffic line, errors may occur in the number of persons passing through the counting area.

That is, in a case where the tracking of the person fails on the way due to the influence of so-called occlusion in which a person hiding behind the display shelf becomes invisible and thus an interruption of the traffic line occurs, if traffic line correction processing of connecting two traffic lines is performed, there is a case where the abnormal traffic line passing through the non-walkable area can be obtained. In addition, in a case where there is an erroneous detection of the person in the tracking of the person, that is, there is an error also in the position of the detected person, there is a case where the abnormal traffic line passing through the non-walkable area can be obtained. As described above, in a case where the traffic line passes through the non-walkable area, an omission in counting the traffic lines occurs in the counting area where the traffic line does not pass in the walkable area of the counting area where the person actually passed, and thus, the accuracy in the number of persons passing through the counting area deteriorates.

With respect to the problems described above, in the technology disclosed in prior art of the former, the number of persons passing through the detection line is counted and only the trajectory of the person (traffic line) around the detection line is acquired. However, in a case where the detection of the person fails due to the influence of the occlusion or the like or in a case where there is an error in the position of the detected person in the detection of the person, there is no change in the fact that the omission in counting the number of persons occurs. Therefore, in any way, it is not possible to solve the problem in that the accuracy of the number of persons passing through the counting area deteriorates.

In addition, the technology disclosed in prior art of the latter is nothing but a technology in which only the normal traffic line can be acquired by eliminating the abnormal portion from the traffic lines acquired by the tracking of the person. The technology is advantageous in the operation of restoring the complete traffic line, but, in any way, cannot solve the problem of the omission in counting the traffic lines due to the abnormality of the traffic line. Therefore, there has been a problem in that the accuracy in counting the number of passing persons cannot be improved.

SUMMARY OF THE INVENTION

A person counting device according to an aspect of the present invention counts the number of persons passing through a counting area set in a monitoring area based on an image obtained by imaging the monitoring area. The person counting device includes: a counting condition setter that sets a non-walkable area in the monitoring area, and sets the counting area in a walkable area excluding the non-walkable area; a traffic line acquirer that acquires a traffic line for each person detected from the image; a passing-person counter that counts the number of persons passing through the counting area based on the traffic line acquired by the traffic line acquirer; a traffic line determinator that determines whether or not the traffic line acquired by the traffic line acquirer passes through the non-walkable area; a correction area selector that, in a case where it is determined that the traffic line passes through the non-walkable area by the traffic line determinator, estimates the counting area existing on an avoidance route that does not pass through the non-walkable area based on the state of the traffic line, and selects the counting area as a correction target; and a passing-person counting corrector that corrects the number of passing persons acquired by the passing-person counter, with regard to the counting area selected as the correction target by the correction area selector.

BRIEF DESCRIPTION OF DRAWINGS

FIG. 5 is a functional block diagram illustrating a schematic configuration of a PC;

FIG. 8 is an explanatory diagram illustrating an example of an estimation table used in the correction area selector;

FIG. 9 is an explanatory diagram illustrating an example of an estimation table used in the correction area selector;

DETAILED DESCRIPTION OF THE PREFERRED EMBODIMENTS

Figure 1:
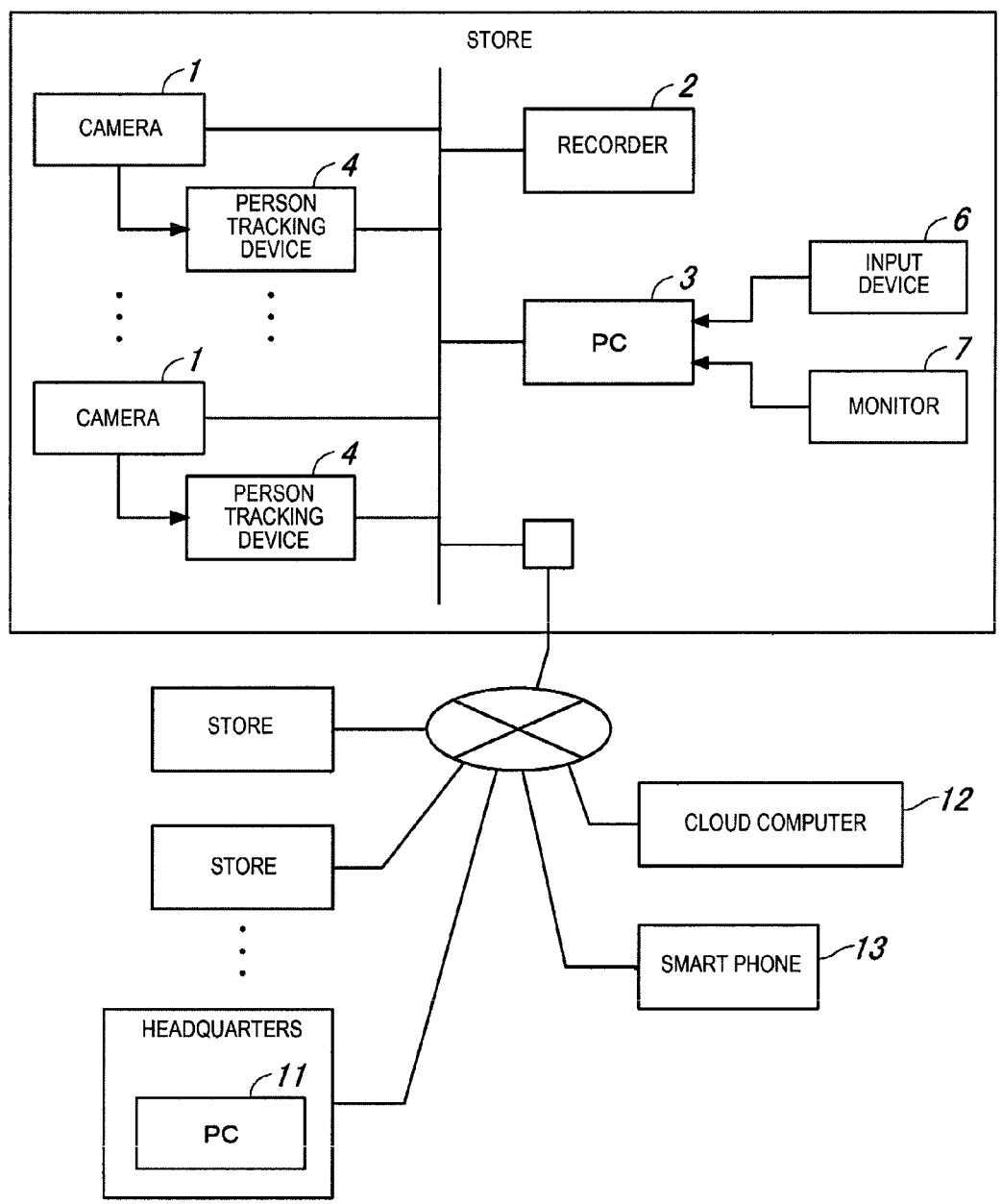
FIG. 1 is an overall configuration diagram of the person counting system in a first embodiment.

The present invention is to provide a person counting device, a person counting system, and a person counting method that is configured so as to decrease omissions in counting which occur in a case where an abnormal traffic line that passes through a non-walkable area is obtained and to improve the accuracy of counting the number of persons passing through the counting area.

According to the first invention, there is provided a person counting device that counts the number of persons passing through a counting area set in a monitoring area based on an image obtained by imaging the monitoring area. The person counting device includes: a counting condition setter that sets a non-walkable area in the monitoring area, and sets the counting area in a walkable area excluding the non-walkable area; a traffic line acquirer that acquires a traffic line for each person detected from the image; a passing-person counter that counts the number of persons passing through the counting area based on the traffic line acquired by the traffic line acquirer; a traffic line determinator that determines whether or not the traffic line acquired by the traffic line acquirer passes through the non-walkable area; a correction area selector that, in a case where it is determined that the traffic line passes through the non-walkable area by the traffic line determinator, estimates the counting area existing on an avoidance route that does not pass through the non-walkable area based on the state of the traffic line, and selects the counting area as a correction target; and a passing-person counting corrector that corrects the number of passing persons acquired by the passing-person counter, with regard to the counting area selected as the correction target by the correction area selector.

In this way, in an abnormal case where the traffic line passes through the non-walkable area, the counting area existing on the avoidance route that does not pass through the non-walkable area is estimated, and the number of persons passing through the counting area is corrected, the omission in counting the traffic lines can be decreased. Therefore, it is possible to improve the counting accuracy of the number of persons passing through the counting area.

In addition, according to the second invention, the traffic line acquirer performs traffic line interpolation processing in which a plurality of traffic lines recognized as one person by the person recognition is linked as one traffic line.

In this way, when performing the traffic line interpolation processing, the abnormal traffic lines passing through the non-walkable area are obtained, and there is a case where the accuracy of counting the number of passing persons decreases. Therefore, the processing of correcting the number of passing persons is effective.

In addition, according to the third invention, the correction area selector estimates the counting area existing on the avoidance route from the state of the traffic lines according to an estimation regulation set in advance.

In this way, it is possible to easily estimate the counting area existing on the avoidance route.

In addition, according to the fourth invention, the estimation regulation is set based on relative positional relationships between the plurality of counting areas and the non-walkable areas.

In this way, it is possible to accurately estimate the counting area existing on the avoidance route.

In addition, according to the fifth invention, the correction area selector estimates the counting area existing on the avoidance route from the state of the traffic line in at least any one of immediately before entering the non-walkable area and immediately after the exit from the non-walkable area.

In this way, it is possible to accurately estimate the counting area existing on the avoidance route.

In addition, according to the sixth invention, in a case where the traffic line passes through the counting area immediately before entering the non-walkable area, the correction area selector sets the counting area as a start point area where a start point of the avoidance route exists, and in a case where the traffic line passes through the counting area immediately after the exit from the non-walkable area, the correction area selector sets the counting area as an end point area where an end point of the avoidance route exists, and then, estimates the counting area existing on the avoidance route from the state of the traffic line in the start point area and the end point area.

In this way, it is possible to simply and accurately estimate the counting area existing on the avoidance route.

In addition, according to the seventh invention, the counting condition setter sets an auxiliary area in the region where the counting area is not set in the walkable area, and in a case where the traffic line passes through an auxiliary area immediately before entering the non-walkable area, the correction area selector sets the auxiliary area as a start point area where a start point of the avoidance route exists, and in a case where the traffic line passes through the auxiliary area immediately after the exit from the non-walkable area, the correction area selector sets the auxiliary area as an end point area where an end point of the avoidance route exists, and then, estimates the counting area existing on the avoidance route from the state of traffic line in the start point area and the end point area.

In this way, it is possible to simply and accurately estimate the counting area existing on the avoidance route. In a case where the traffic line does not pass through the counting area immediately before entering the non-walkable area and immediately after the exit from the non-walkable area, it is possible to avoid the situation that the counting area existing on the avoidance route cannot be estimated.

In addition, according to the eighth invention, the correction area selector estimates the counting area existing on the avoidance route from the moving direction of the person in at least any one of the start point area and the end point area.

In this way, even in a case where the avoidance route cannot be specified by only the position of the start point area or the end point area, the position of the avoidance route can be narrowed down by the moving direction of the person. Therefore, it is possible to further improve the estimation accuracy of the counting area existing on the avoidance route.

In addition, according to the ninth invention, the correction area selector estimates the counting area existing on the avoidance route from an elapsed time required for moving from the start point area to the end point area.

In this way, even in a case where the avoidance route cannot be specified by only the position of the start point area or the end point area, the position of the avoidance route can be narrowed down by the elapsed time. Therefore, it is possible to further improve the estimation accuracy of the counting area existing on the avoidance route.

In addition, according to the tenth invention, the person counting device further includes a learning modeler that collects the normal traffic line that does not pass through the non-walkable area from the traffic lines acquired in the past by the traffic line acquirer, and constructs a learning model based on such the normal traffic line. The correction area selector estimates the counting area existing on the avoidance route from the state of the traffic line based on the learning model constructed by the learning modeler.

In this way, it is possible to accurately estimate the counting area existing on the avoidance route.

In addition, according to the eleventh invention, there is provided a person counting system that counts the number of persons passing through a counting area set in the monitoring area based on an image obtained by imaging the monitoring area. The system includes a camera that images the monitoring area and a plurality of information processing devices. Any one of the plurality of information processing devices includes: a person tracker that detects a person from the image by the camera and acquires position information; a counting condition setter that sets a non-walkable area in the monitoring area, and sets the counting area in a walkable area excluding the non-walkable area; a traffic line acquirer that acquires a traffic line for each person based on the position information acquired by the person tracker; a passing-person counter that counts the number of persons passing through the counting area based on the traffic line acquired by the traffic line acquirer; a traffic line determinator that determines whether or not the traffic line acquired by the traffic line acquirer passes through the non-walkable area; a correction area selector that, in a case where it is determined that the traffic line passes through the non-walkable area by traffic line determinator, estimates the counting area existing on an avoidance route that does not pass through the non-walkable area based on the state of the traffic line, and selects the counting area as a correction target; and a passing-person counting corrector that corrects the number of passing persons acquired by the passing-person counter, with regard to the counting area selected as the correction target by the correction area selector.

In this way, as similar to the first invention, the omission in counting the traffic lines can be decreased in the abnormal case where the traffic line passes through the non-walkable area. Therefore, it is possible to improve the counting accuracy of the number of persons passing through the counting area.

In addition, according to the twelfth invention, there is provided a person counting method that causes the information processing device to perform processing of counting the number of persons passing through a counting area set in the monitoring area based on an image obtained by imaging the monitoring area. The method includes steps of setting a non-walkable area in the monitoring area, and setting the counting area in a walkable area excluding the non-walkable area; acquiring a traffic line for each person from the detected from the image; counting the number of persons passing through the counting area based on the traffic line; determining whether or not the traffic line passes through the non-walkable area; estimating the counting area existing on an avoidance route that does not pass through the non-walkable area based on the state of the traffic line in a case where it is determined that the traffic line passes through the non-walkable area, and selecting the counting area as a correction target; and correcting the number of passing persons relating to the counting area selected as the correction target.

In this way, similar to the first invention, the omission in counting the traffic lines can be decreased in the abnormal case where the traffic line passes through the non-walkable area. Therefore, it is possible to improve the counting accuracy of the number of persons passing through the counting area.

Hereinafter, embodiments of the present invention will be described with reference to the drawings.

First Exemplary Embodiment

FIG. 1 is an overall configuration diagram of the person counting system in the first embodiment. This person counting system is built in a retail store such as a convenience store, and includes camera 1, recorder (image recording device) 2, PC (person counting device) 3, and person tracking device (person tracker) 4. In the configuration illustrated in FIG. 1, camera 1 and person tracking device (person tracker) 4 are described as separate devices. However, with the sophisticated functions of the camera in recent year, a development of a camera has progressed, in which functions of detecting and tracking a moving object (function of extracting the traffic line or the like) are embedded. Therefore, using this kind of camera, it is possible to configure the system in which traffic line information can be directly transmitted to the PC or a server. In this case, the only thing the PC or the server is to do is perform person counting statistical processing using a mounted and dedicated application based on the traffic line information transmitted from the camera, and perform drawing processing to make the obtained statistical information become a browsable form on a display device. Therefore, it is possible to significantly reduce the load on performing the data processing.

Camera 1 is installed on an appropriate position in the store and the monitoring area in the store is imaged by camera 1. Image information obtained by the imaging is recorded in recorder 2.

Input device 6 such as a mouse that performs various input operations by a user such as a monitoring person and monitor (display device) 7 that displays a monitor screen are connected to PC 3. Input device 6 and monitor 7 may be configured with a touch panel display.

PC 3 is installed in a security room of the store and the monitoring person (security guard) can browse the images inside the store imaged by camera 1 in real time on the monitor screen displayed on monitor 7. In addition, it is possible to browse the images inside the store imaged in the past and recorded in recorder 2.

A monitor which is not illustrated is also connected to PC 11 installed in a headquarters, and the images inside the store imaged by camera 1 can be browsed in real time or the images inside the store imaged in the past and recorded in recorder 2 can be browsed, and thus, it is possible to check the situations in the store at the headquarters. PCs 3 and 11 include a processor (CPU) and a program memory. The CPU of PC 3 is realized by causing the program (instruction) for monitoring to be executed. The program may be induced to PC 3 in advance as the information processing device and may configure the dedicated device, or may be provided to the user by being recorded in an appropriate program recording medium as an application program that operates on a general-purpose OS or via a network.

In person tracking device 4, the person (moving object) is detected from the image imaged by camera 1 and the tracking information (position information or the like) for each person is output. The known image-recognition technology (person detection technology and person tracking technology) may be used in this person tracking processing.

Figure 2:
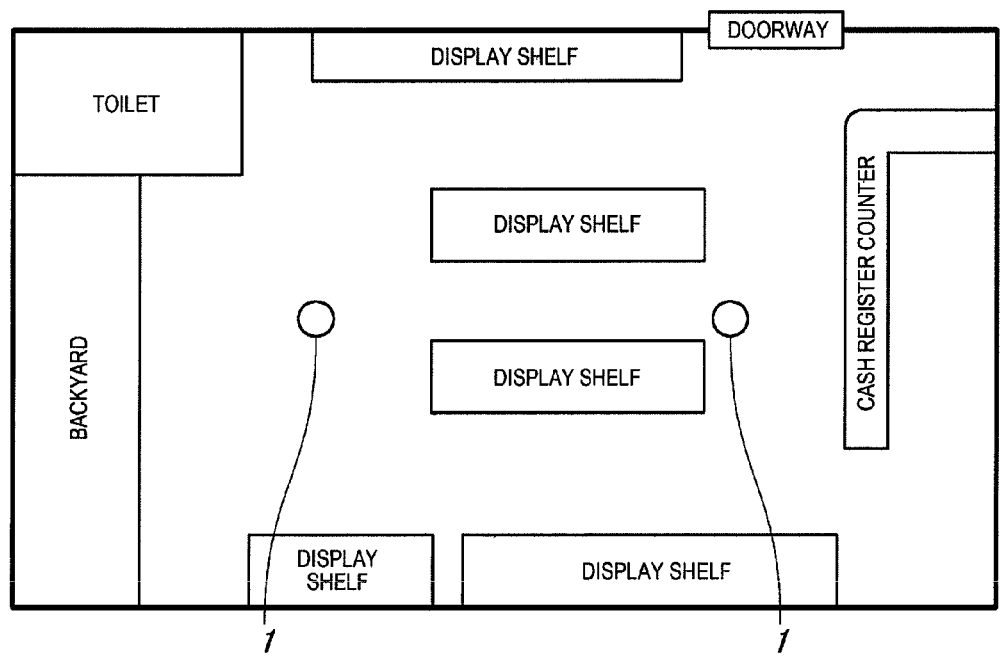
FIG. 2 is a plan view of a store explaining a layout of the store and an installation state of a camera.

Next, a layout of the store and an installation state of camera 1 will be described with a convenience store as an example. FIG. 2 is a plan view of a store explaining the layout of the store and the installation state of camera 1.

A doorway, display shelves, and a cash register counter are provided in the store. On the display shelves, lunch, plastic bottles, or rice balls are installed separately in the types of the products. Customers enters the store through the doorway and moves in the store through isle between the display shelves, and when a desired product is found, goes to the cash register counter with the product to finish the accounting (payment of the price of the products) at the cash register counter, and then, goes out from the store through the doorway.

In addition, in the store, a plurality of cameras 1 that images inside the store (monitoring area) is installed. In the example illustrated in FIG. 2, omni-directional cameras having an imaging range of 360° using a fish-eye lens in camera 1 is adopted, and the persons moving in the store can be imaged by such cameras 1.

Figure 3:
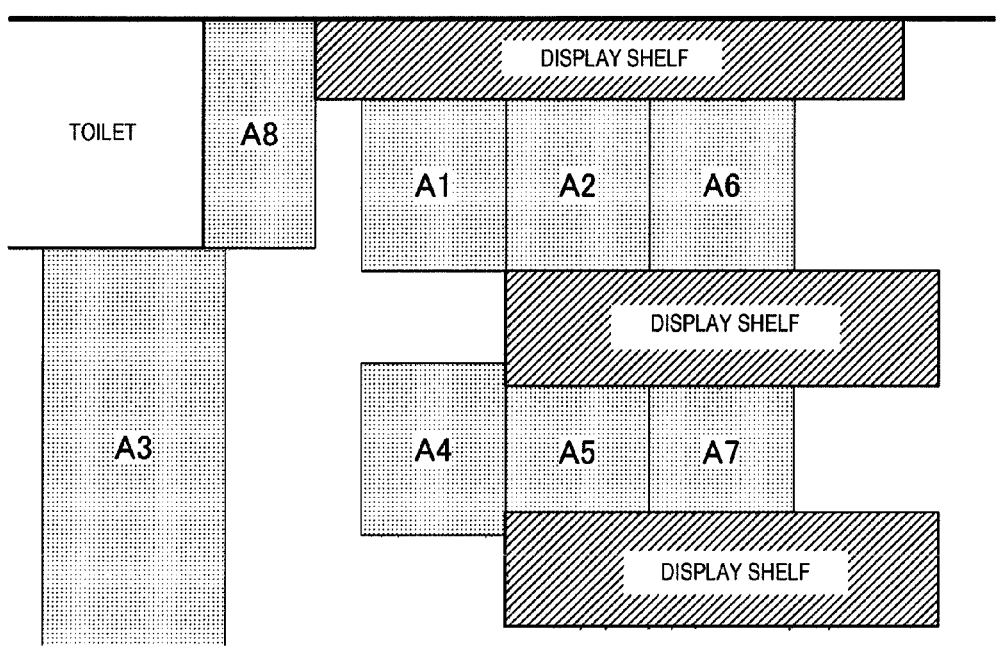
FIG. 3 an explanatory diagram illustrating an example of setting a non-walkable area and a counting area in the store.

Next, a non-walkable area and a counting area set in the monitoring area (in the store) will be described. FIG. 3 is an explanatory diagram illustrating an example of setting a non-walkable area and a counting area in the store.

In the present embodiment, in order to check a degree of customer interest with respect to the display shelf of the products of interest, the person counting processing is performed by PC 3, in which the counting area is set on a passage in front of the display shelf of the products of interest, the persons passing through the counting area is detected based on the image of the monitoring area (in the store) imaged by camera 1, and then, the number of passing persons in the counting area, that is, the number of persons passing through the counting area during a predetermined counting period, is counted.

In performing the person counting processing, first, a non-walkable area where the person cannot enter is set in the area where the display shelf or the cash register counter are installed. The counting area is set in a walkable area that is the area where the non-walkable area is excluded from the monitoring area according to the necessity of the user. This setting of the non-walkable area and the counting area is performed according to the input operation by the user, for example, a setting screen is displayed on monitor 7, and the user inputs the positions of the non-walkable area and the counting area on the placement diagram displayed on the setting screen using input device 6 such as a mouse.

Figure 4A:
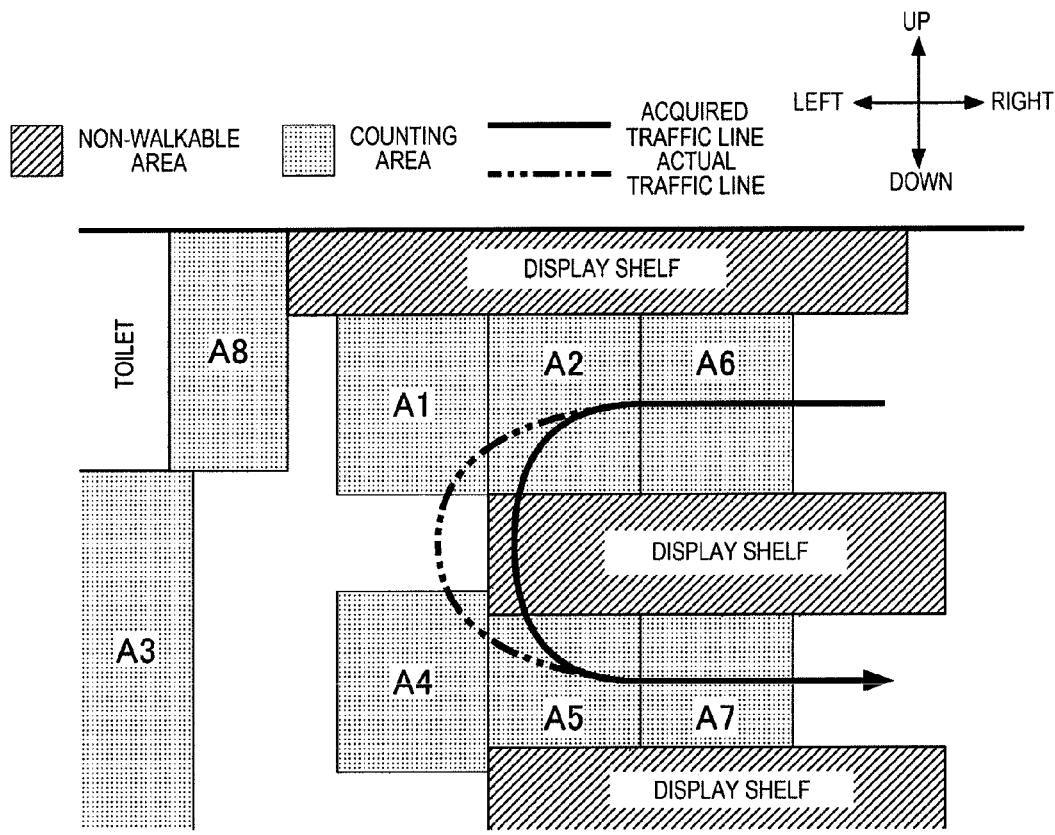
FIG. 4A and FIG. 4B are explanatory diagrams illustrating an example of an abnormal traffic line passing through the non-walkable area.
Figure 4B:
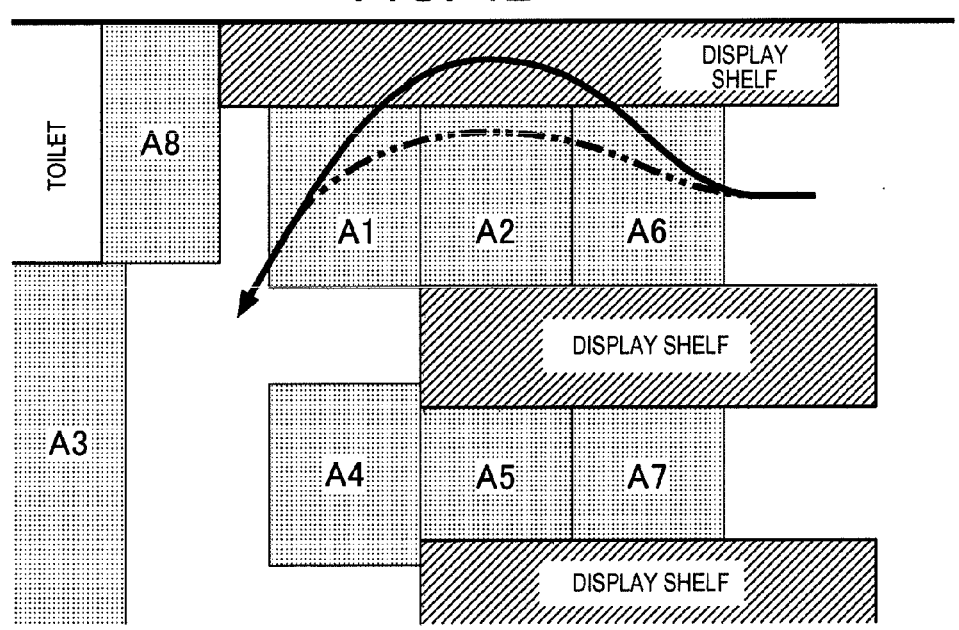

Next, an abnormal traffic line passing through the non-walkable area will be described. FIG. 4A and FIG. 4B are explanatory diagrams illustrating an example of an abnormal traffic line passing through the non-walkable area.

In the present embodiment, the traffic line of each person is acquired based on the image of the monitoring area (in the store) imaged by camera 1 and the number of times the traffic line of each person passes through each counting area is counted, and then, the number of persons passing each counting area (number of persons count value) is counted.

Here, if the person tracking fails by an occlusion or the like due to the display shelves or the like, or if there is an error in the position of a person detected by the person tracking, as illustrated in FIGS. 4A and 4B, there is a case where the acquired traffic line becomes an abnormal traffic line in which the traffic line passes through the non-walkable area, and in this case, an omission in counting the traffic lines occurs in the counting area where the acquired traffic line does not pass in the counting area where the traffic lines actually passed. In the example illustrated in FIG. 4A, the omission in counting in counting the traffic lines occurs in counting areas A1 and A4, and in the example illustrated in FIG. 4B, the omission in counting the traffic lines occurs in counting areas A2.

Therefore, in the present embodiment, it is determined whether or not the acquired traffic line passes through the non-walkable area, and in a case where the traffic line passes through the non-walkable area, the counting area existing on an avoidance route that does not pass through the non-walkable area is estimated based on the state of the traffic line, and then, the number of persons passing through that counting area is corrected.

Next, the person counting processing performed in PC 3 illustrated in FIG. 1 will be described. FIG. 5 is block diagram illustrating a schematic configuration of PC 3.

PC 3 includes tracking information storage 21, traffic line acquirer 22, traffic line information storage 23, counting condition setter 24, passing-person counter 25, traffic line determinator 26, estimation regulation storage 27, correction area selector 28, passing-person counting corrector 29, and display information generator 30.

In tracking information storage 21, the tracking information acquired from person tracking device 4 is accumulated. In the tracking information, information relating to a detection position of each person in each frame of the image imaged by camera 1 and a detection time of each person acquired from the imaging time of each frame from which the person is detected, are included.

In traffic line acquirer 22, processing of acquiring the traffic line of each person detected from the image of the monitoring area is performed. This traffic line acquisition processing is performed based on the position information of each person generated in person tracking device 4 and accumulated in tracking information storage 21. The information relating to the traffic line of each person acquired by traffic line acquirer 22 is accumulated in traffic line information storage 23.

In counting condition setter 24, processing of setting a counting condition in the person counting processing is performed according to the input from the user. In the present embodiment, the non-walkable area is set in the monitoring area and a plurality of counting areas is set in the walkable area excluding the non-walkable area.

In passing-person counter 25, processing of counting the number of persons passing through each of the plurality of counting areas, that is, the number of persons passing through each of the counting area during a predetermined counting period is performed based on the traffic lines of each person acquired by traffic lines acquirer 22 and accumulated in traffic line information storage 23. In this passing-person counting processing, the traffic lines passing through the counting area, specifically, the number of passing persons, is counted for each counting area by counting the traffic lines entering the counting area.

In traffic line determinator 26, processing of determining whether or not the traffic line passes through the non-walkable area is performed with regard to the traffic lines acquired by traffic line acquirer 22 and accumulated in traffic line information storage 23.

In passing-person counter 25 and traffic line determinator 26, it is determined whether or not the traffic line enters the counting area and the non-walkable area based on an intersection situation between the sides (border) of the counting area or the non-walkable area and the traffic line. However, in this determination, the determination may be performed only by the information of the detection positions aligned in the time series without obtaining the intersection point between the sides (border) of the counting area or the non-walkable area and the traffic line. For this reason, in the traffic line information acquired by traffic line acquirer 22, the line segment information (vector) linking the detection positions is not necessarily required.

In correction area selector 28, in a case where it is determined that the traffic line passes through the non-walkable area by traffic line determinator 26, processing of estimating the counting area existing on the avoidance route that does not pass through the non-walkable area based on the state of the traffic line, and selecting that counting area as a correction target, is performed. This processing performed by correction area selector 28 will be described below.

In the present embodiment, the counting area existing on the avoidance route is estimated from the state of the traffic line according to the estimation regulation set in advance. The estimation regulation is set based on the relative positional relationship between the counting area and the non-walkable area. That is, the avoidance route that does not pass through the non-walkable area is estimated based on the relative positional relationship between the counting area and the non-walkable area, and the estimation regulation is set based on the positional relationship, and thus, it is possible to estimate the counting area existing on the avoidance route. The estimation regulation is set in advance by the user and stored in estimation regulation storage 27.

In passing-person counting corrector 29, processing of correcting the number of passing persons acquired by passing-person counter 25 is performed with regard to the counting area selected as the correction target by correction area selector 28. In this passing-person counting correction processing, when the counting area is selected as the correction target with regard to one traffic line, the number of persons passing through the selected counting area increases in increments of one person. In addition, in a case where a plurality of counting areas is selected as the correction target, that is, in a case where there exists a plurality of counting areas existing on the avoidance route that does not pass through the non-walkable area, the number of persons passing through each of the counting areas is respectively corrected.

In display information generator 30, processing of acquiring the number of persons passing through the counting area which is not needed to be corrected from passing-person counter 25, and acquiring the number of persons passing through the counting area which is corrected in passing-person counting corrector 29, and then, generating the display information for displaying the person counting result information relating to number of passing persons for each counting area on monitor 7, is performed. In this way, the person counting result is displayed on monitor 7.

Each unit of PC 3 illustrated in FIG. 5 is realized by executing a program for the person counting in the CPU of PC 3. The program may be induced to PC 3 in advance as the information processing device and may configure the dedicated device, or may be provided to the user by being recorded in an appropriate program recording medium as an application program that operates on a general-purpose OS or via a network.

Figure 6A:
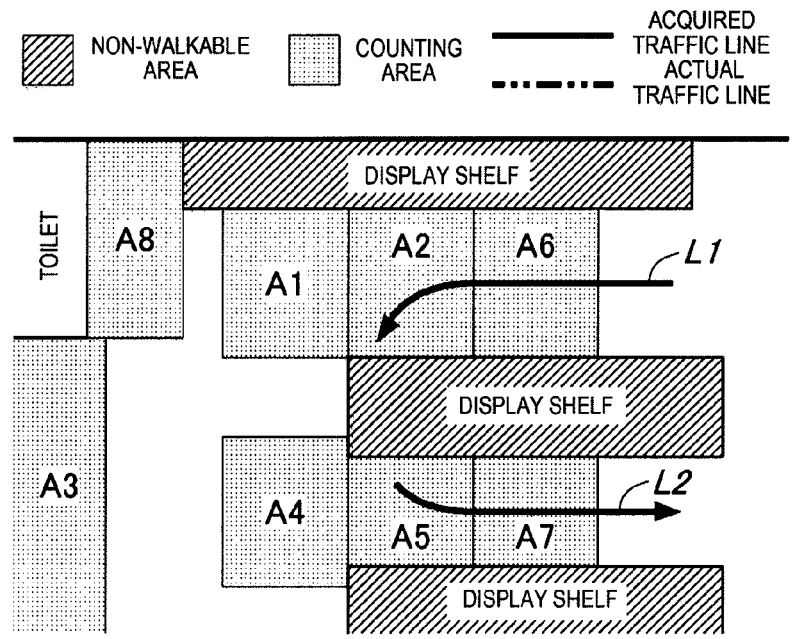
FIG. 6A, FIG. 6B, and FIG. 6C are explanatory diagrams that explain traffic line interpolation processing performed in a traffic line acquirer.
Figure 6B:
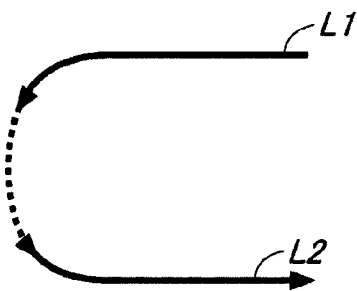
Figure 6C:
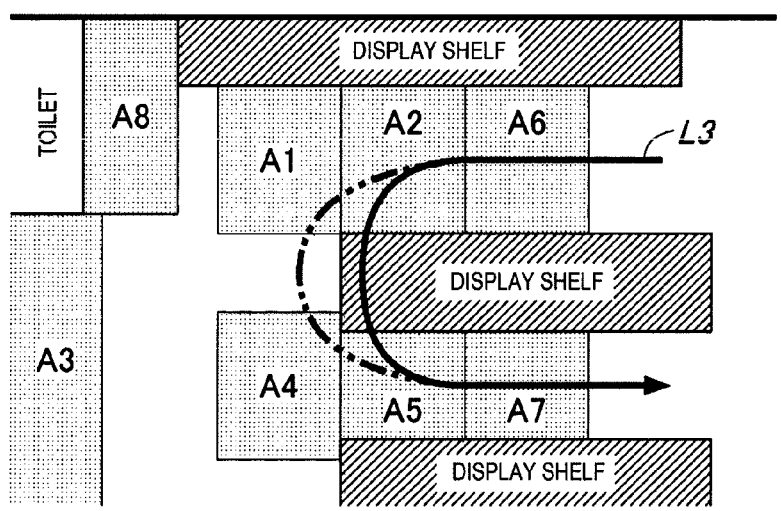

The traffic line interpolation processing performed in traffic line acquirer 22 illustrated in FIG. 5 will be described. FIG. 6A, FIG. 6B, and FIG. 6C are explanatory diagrams that explain traffic line interpolation processing performed in traffic line acquirer 22.

In the present embodiment, the processing of acquiring the traffic line for each person detected from the image of the monitoring area is performed in traffic line acquirer 22. In this traffic line acquisition processing, the traffic line interpolation processing is performed, in which the traffic lines are acquired by linking the detection position of the person in a time series, and in the acquired traffic lines, if the plurality of traffic lines is determined to be the same person by person recognition, the plurality of traffic lines is connected as one.

When the tracking of the person fails on the way due to the influence of the occlusion caused by the display shelf, as illustrated in FIG. 6A, the traffic line comes into the interrupted state. However, if two traffic lines L1 and L2 are determined to the same person by the person recognition, the traffic line interpolation processing for linking those two traffic lines L1 and L2 into one is performed as illustrated in FIG. 6B. In this way, traffic line L3 is obtained as illustrated in FIG. 6C. However, since traffic line L3 passes through the non-walkable area, in traffic line determinator 26, traffic line L3 is determined to be an abnormal traffic line that passes through the non-walkable area.

Here, the example of generating the traffic line that passes through the non-walkable area by the traffic line interpolation processing is described. However, in some cases, the traffic line that passes through the non-walkable area is obtained without performing the traffic line interpolation processing. That is, when there is an error in the position of the person detected by the person tracking, there is a case where the traffic line that passes through the non-walkable area is obtained.

Figure 7:
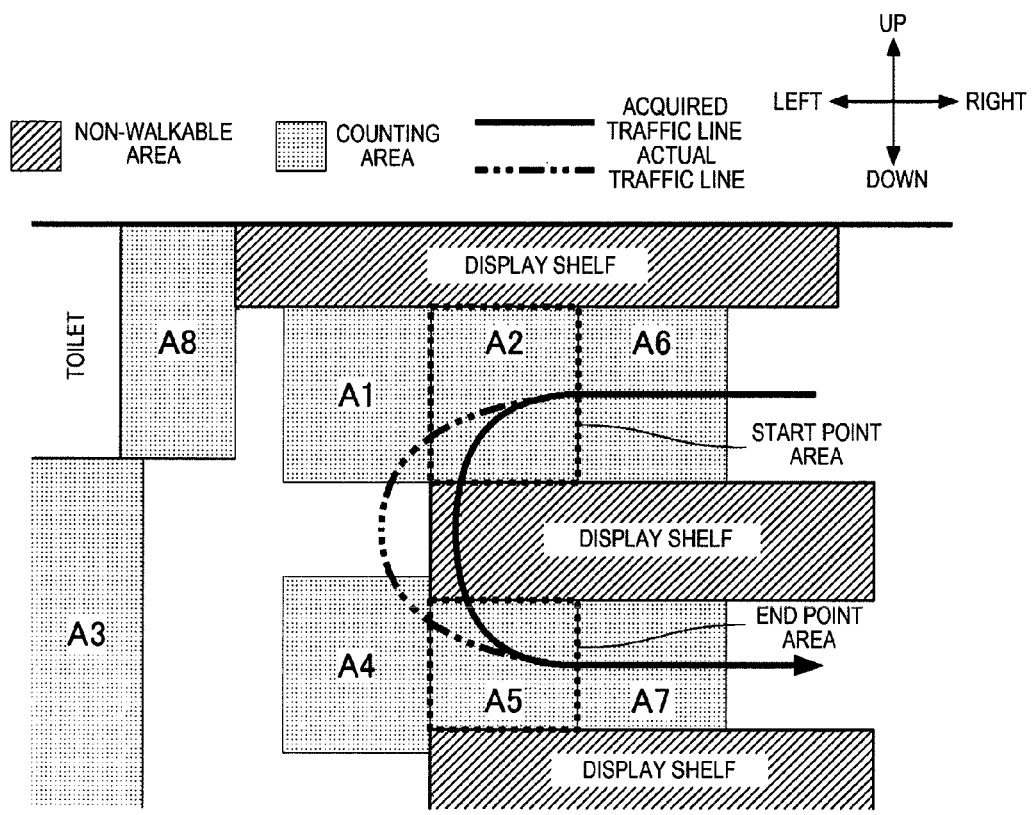
FIG. 7 is an explanatory diagram that explains processing performed in a correction area selector.

Next, processing performed in correction area selector 28 illustrated in FIG. 5 will be described. FIG. 7 is an explanatory diagram that explains the processing performed in correction area selector 28.

In correction area selector 28, in a case where it is determined that the traffic line passes through the non-walkable area by traffic line determinator 26, the processing is performed, in which the counting area existing on the avoidance route that does not pass through the non-walkable area is estimated based on the state of the traffic line and that counting area is selected as the correction target.

In estimating the counting area existing on the avoidance route that does not pass through the non-walkable area, it is necessary to predict the avoidance route from the state of the normal portion excluding the abnormal portion where the traffic line passes through the non-walkable area, particularly, in predicting the avoidance route, the state of the traffic line immediately before entering the non-walkable area and the state of the traffic line immediately after the exit from the non-walkable area are important. Therefore, in the present embodiment, in correction area selector 28, the counting area existing on the avoidance route is estimated from at least any one of the states of the traffic lines immediately before entering the non-walkable area and immediately after the exit from the non-walkable area.

Furthermore, in the present embodiment, in a case where the traffic line passes through the counting area immediately before entering the non-walkable area, that counting area is set as a start point area where a start point of the avoidance route exists, and in a case where the traffic line passes through the counting area immediately after the exit from the non-walkable area, that counting area is set as an end point area where an end point of the avoidance route exists, and then, the counting area existing on the avoidance route is estimated from the state of the traffic line in the start point area and the end point area.

Next, an estimation table used in correction area selector 28 illustrated in FIG. 5 will be described. FIG. 8 and FIG. 9 are explanatory diagrams illustrating examples of the estimation tables used in correction area selector 28. FIG. 10 and FIG. 11 are explanatory diagrams illustrating various examples of the traffic lines.

In the present embodiment, in correction area selector 28, the estimation tables illustrated in FIG. 8 and FIG. 9 are used as the estimation regulation for estimating the counting area existing on the avoidance route. In correction area selector 28, the counting area existing on the avoidance route, that is, a correction area (the counting area that is the correction target) is estimated with reference to the estimation tables.

The estimation table is a table for obtaining the counting area existing on the avoidance route from the state of the traffic line at the start point area and the end point area. The avoidance route that links the start point area and the end point area is predicted based on the relative positional relationship with the non-walkable area around the start point area and the end point area. However, in a case of only the positional relationship, there is a case where a plurality of avoidance routes exists. In this case, by considering the state of the traffic line at the start point area and the end point area, that is, specifically, the moving direction of the person at the start point area and the end point area, the avoidance route can be narrowed down. Furthermore, by considering an elapsed time required for moving from the start point area to the end point area, the avoidance route can be narrowed down.

The estimation table illustrated in FIG. 8 is a table for obtaining the counting area existing on the avoidance route based on only the moving direction at the start point area and the end point area.

Figure 10A:
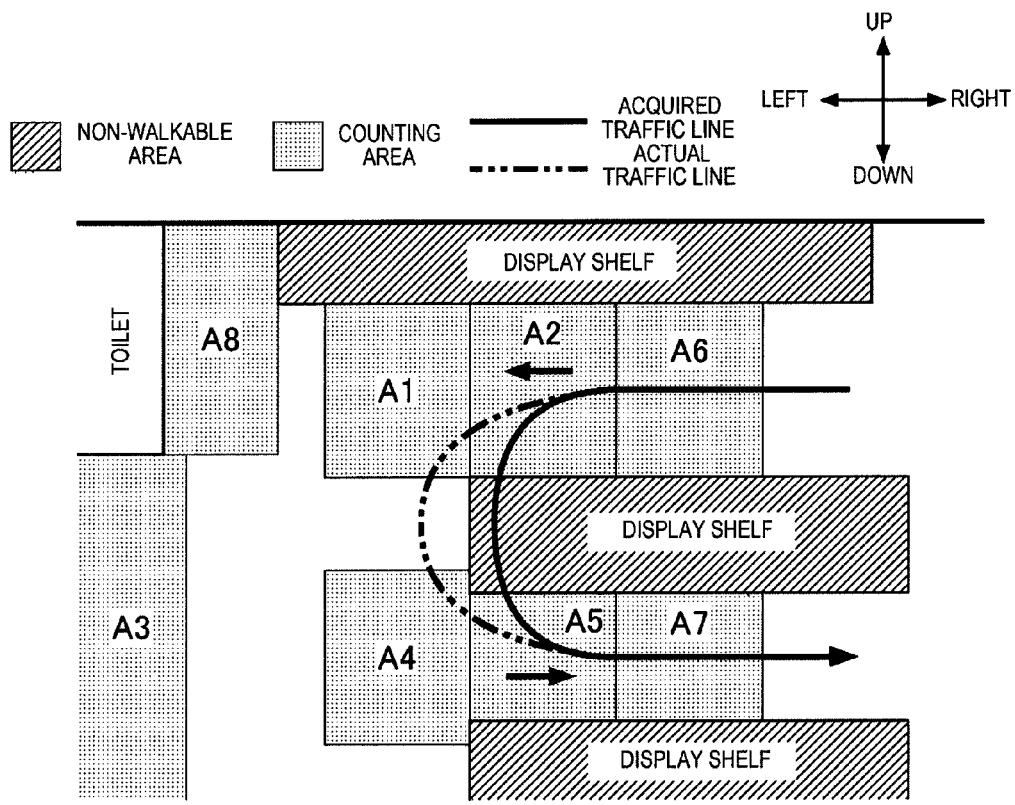
FIG. 10A and FIG. 10B are explanatory diagrams illustrating various examples of the traffic line.
Figure 10B:
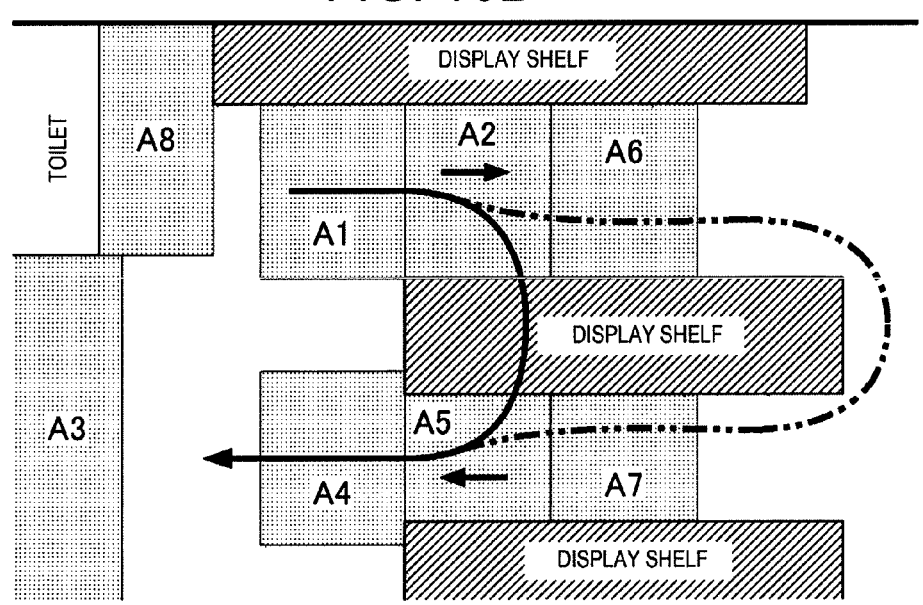

Here, in each case illustrated in FIGS. 10A and 10B, the traffic line passes counting area A2 immediately before entering the non-walkable area and counting area A2 becomes the start point area where the start point of the avoidance route exists, and the traffic line passes counting area A5 immediately after the exit from the non-walkable area and counting area A5 becomes the end point area where the end point of the avoidance route exists, and thus, in the example illustrated in FIGS. 10A and 10B, the start point areas in FIGS. 10A and 10B are the same and the end point areas in FIGS. 10A and 10B are the same.

On the other hand, in each case illustrated in FIGS. 10A and 10B, the moving directions at the start point area and the end point area are different from each other. That is, in the case illustrated in FIG. 10A, the moving direction at counting area A2 that is the start point area is left and the moving direction at counting area A5 that is the end point area is right, and in the case illustrated in FIG. 10B, the moving direction at counting area A2 that is the start point area is right and the moving direction at counting area A5 that is the end point area is left.

Therefore, by focusing on the moving direction in the start point area and the end point area, it is possible to distinguish each of the cases illustrated in FIGS. 10A and 10B from each other. As illustrated in FIG. 8, in a case where the moving direction in counting area A2 which is the start point area is left and the moving direction in counting area A5 which is the end point area is right, counting areas A1 and A4 become the correction area, and in a case where the moving direction in counting area A2 which is the start point area is right and the moving direction in counting area A5 which is the end point area is left, counting areas AG and A7 become the correction area.

In addition, the estimation table illustrated in FIG. 9 is a table for obtaining the counting area existing on the avoidance route based on the moving direction in the start point area and the end point area and the elapsed time required for moving from the start point area to the end point area.

Figure 11A:
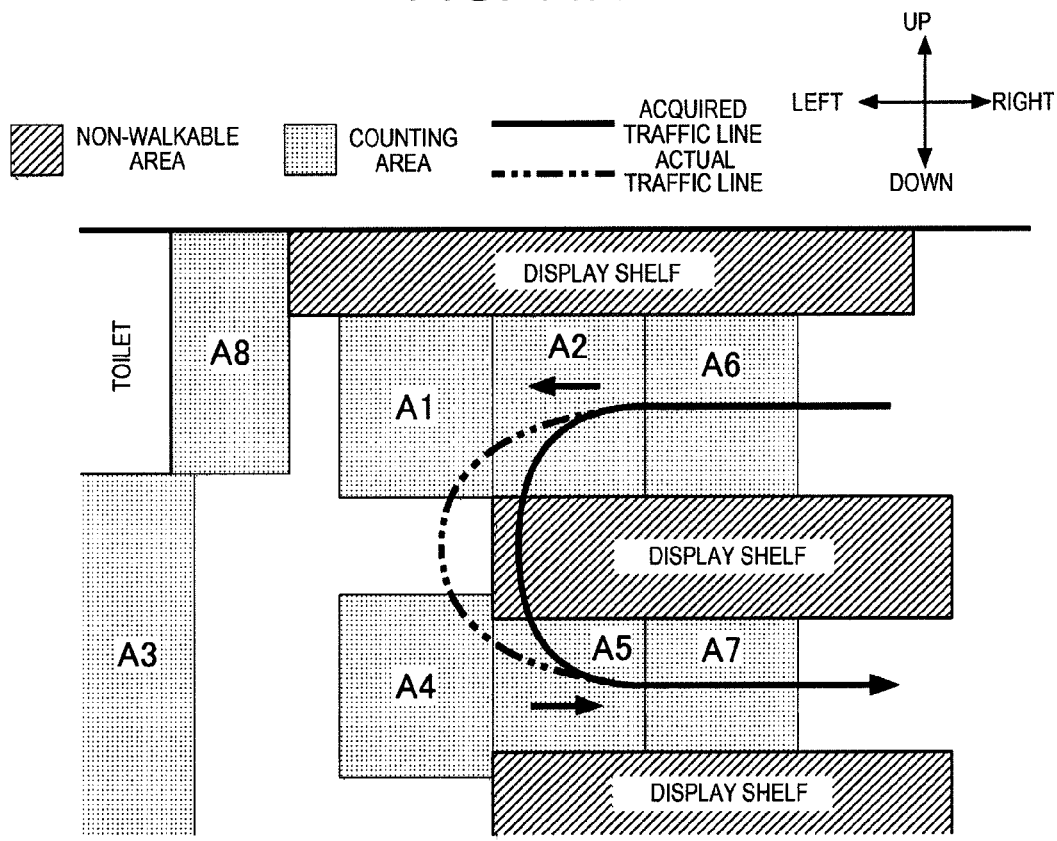
FIG. 11A and FIG. 11B are explanatory diagrams illustrating various examples of the traffic line.
Figure 11B:
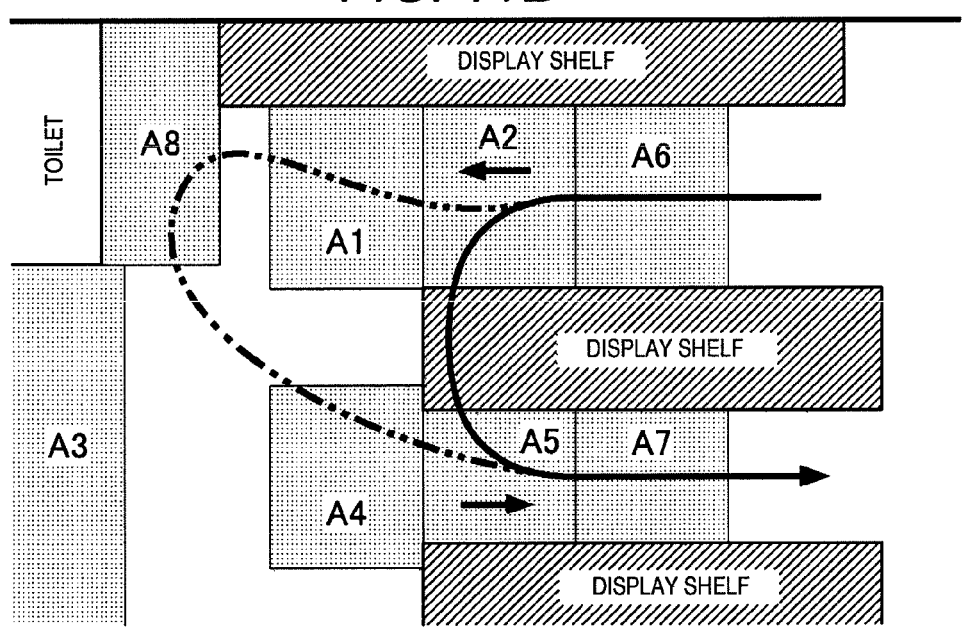

Here, in each case illustrated in FIGS. 11A and 11B, the traffic line passes through counting area A2 immediately before entering the non-walkable area, and counting area A2 becomes the start point area where the start point of the avoidance route exists, and the traffic line passes through counting area A5 immediately after the exit from the non-walkable area, and counting area A5 becomes the end point area where the end point of the avoidance route exists, and thus, in the example illustrated in FIGS. 11A and 11B, the start point areas in FIGS. 11A and 11B are the same and the end point areas in FIGS. 11A and 11B are the same.

In addition, in each case illustrated in FIGS. 11A and 11B, the moving direction in counting area A2 which is the start point area is left and the moving direction in counting area A5 which is the end point area is right, and thus, in each case illustrated in FIGS. 11A and 11B, the moving directions in the start point areas illustrated in FIGS. 11A and 11B are the same and the end point areas illustrated in FIGS. 11A and 11B are the same, respectively.

On the other hand, in each case illustrated in FIGS. 11A and 11B, the elapsed times required for moving from counting area A2 which is the start point area to counting area A5 which is the end point area are different from each other. That is, in the case illustrated in FIG. 11A, since the actual traffic line passes through only counting areas A1 and A4, the elapsed time becomes short, and in the case illustrated in FIG. 11B, since the actual traffic line passes through counting area A8 in addition to counting areas A1 and A4, the elapsed time becomes long.

Therefore, by focusing on the elapsed time required for moving from the start point area to the end point area, it is possible to distinguish each of the cases illustrated in FIGS. 11A and 11B from each other. As illustrated in FIG. 9, in a case where the elapsed time required for moving from counting area A2 which is the start point area to counting area A5 which is the end point area is short, specifically, the elapsed time is shorter than 10 seconds, counting areas A1 and A4 become the correction areas, and in a case where the elapsed time required for moving from counting area A2 which is the start point area to counting area A5 which is the end point area is long, specifically, the elapsed time is longer than 10 seconds, counting areas A1, A8, and A4 become the correction areas.

In the present embodiment described above, in a case where the traffic line passes through the non-walkable area, in correction area selector 28, the counting area existing on the avoidance route that does not pass through the non-walkable area is estimated based on the state of the traffic lines and the counting area is selected as the correction target, and in passing-person counting corrector 29, the number of persons passing through the counting area selected as the correction target is corrected. Therefore, the omission in counting the traffic lines caused in a case where the abnormal traffic line passing through the non-walkable area is obtained can be decreased, and thus, it is possible to improve the counting accuracy of the number of persons passing through the counting area.

In addition, in the present embodiment, in traffic line acquirer 22, the traffic line interpolation processing in which a plurality of traffic lines recognized as one person by the person recognition is linked as one traffic line, is performed. When this traffic line interpolation processing is performed, the abnormal traffic lines passing through the non-walkable area are obtained, and there is a case where the accuracy of counting the number of passing persons decreases. Therefore, the processing of correcting the number of passing persons is effective as described before.

In addition, in the present embodiment, in correction area selector 28, the counting area existing on the avoidance route is estimated from the state of the traffic line according to the estimation regulation set in advance. Therefore, it is possible to simply estimate the counting area existing on the avoidance route.

In addition, in the present embodiment, the estimation regulation is set based on the relative positional relationships between the plurality of counting areas and the non-walkable areas. Therefore, it is possible to accurately estimate the counting area existing on the avoidance route.

In addition, in the present embodiment, in correction area selector 28, the counting area existing on the avoidance route is estimated from the state of the traffic line in at least any one of immediately before entering the non-walkable area and immediately after the exit from the non-walkable area. Therefore, it is possible to accurately estimate the counting area existing on the avoidance route.

In addition, in the present embodiment, in correction area selector 28, the counting area where the traffic line passes through the counting area immediately before entering the non-walkable area is set as a start point area, and the counting area where the traffic line passes through the counting area immediately after the exit from the non-walkable area is set as an end point area, and then, the counting area existing on the avoidance route is estimated from the state of traffic lines in the start point area and the end point area. Therefore, it is possible to simply and accurately estimate the counting area existing on the avoidance route.

In addition, in the present embodiment, in correction area selector 28, since the counting area existing on the avoidance route is estimated from the moving direction of the person in at least any one of the start point area and the end point area, or the counting area existing on the avoidance route is estimated from the elapsed time required for moving from start point area to the end point area, even in a case where the avoidance route cannot be specified by only the position of the start point area and the end point area, the position of the avoidance route can be narrowed down by the moving direction of the person or the elapsed time. Therefore, it is possible to further improve the estimation accuracy of the counting area existing on the avoidance route.

Second Exemplary Embodiment

Figure 12A:
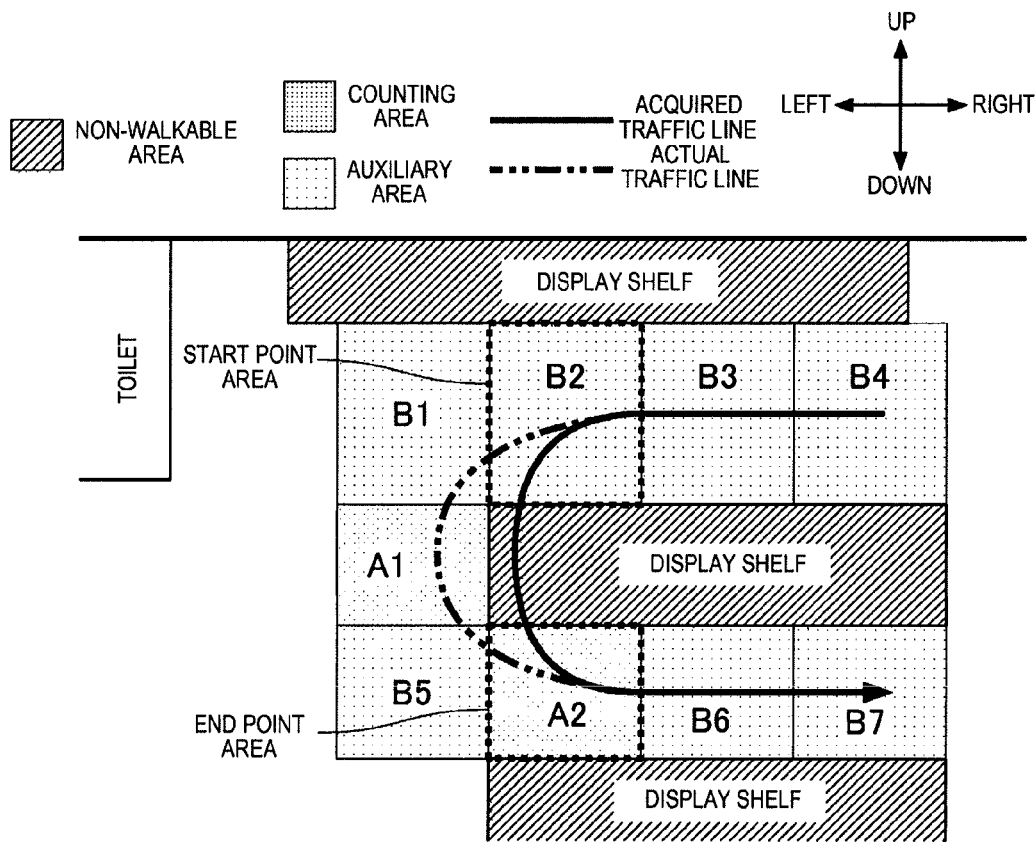
FIG. 12A and FIG. 12B are explanatory diagrams illustrating an example of an auxiliary area set in a monitoring area in a second embodiment.
Figure 12B:
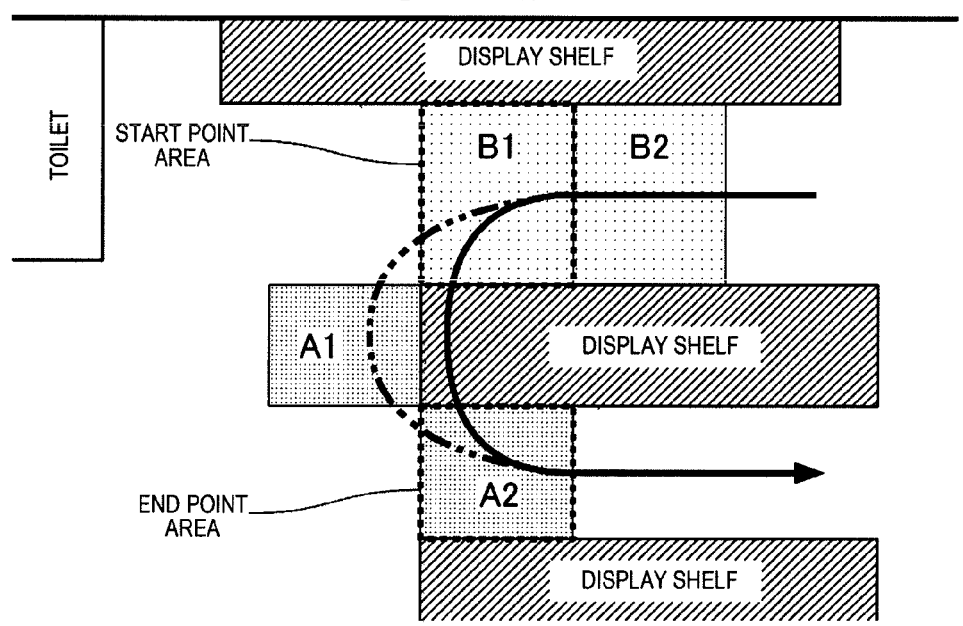

Next, the second embodiment will be described. FIG. 12A and FIG. 12B are explanatory diagrams illustrating an example of an auxiliary area set in a monitoring area in the second embodiment. Points that are not particularly described here are similar to those in the first embodiment.

In the first embodiment, in correction area selector 28, in a case where the traffic line passes through the counting area immediately before entering the non-walkable area, the counting area is set as the start point area, and in a case where the traffic line passes through the counting area immediately after exit from the non-walkable area, the counting area is set as the end point area, and then, the counting area existing on the avoidance route is estimated from the state of moving in the start point area and the end point area. However, in the configuration described above, in a case where the counting area is not set immediately before and after the non-walkable area, that is, in a case where the traffic line does not pass through the counting area immediately before entering the non-walkable area and immediately after the exit from the non-walkable area, the state of the traffic lines immediately before entering the non-walkable area and immediately after the exit from the non-walkable area cannot be acquired.

Therefore, in the second embodiment, in counting condition setter 24, as illustrated in FIG. 12, in the walkable area, an auxiliary area is set in the region where the counting area is not set. In correction area selector 28, in a case where the traffic line passes through the auxiliary area immediately before entering the non-walkable area, the auxiliary area is set as the start point area where the start point of the avoidance route exists, and in a case where the traffic line passes through the auxiliary area immediately after the exit from the non-walkable area, the auxiliary area is set as the end point area where the end point of the avoidance route exists. The processing of estimating the counting area existing on the avoidance route from the state of traffic line in the start point area and the end point area is performed. At this time, similar to the first embodiment, the estimation tables illustrated in FIG. 8 and FIG. 9 can be used.

It is desirable that the auxiliary area is set, in the walkable area, in the region where the counting area is not set so as to be adjacent to the non-walkable area. However, it is not necessarily set around the non-walkable area without any interval, but may be set only in the required position. In the example illustrated in FIG. 12A, auxiliary areas B1 to B7 are set around the non-walkable area without the interval. In the example illustrated in FIG. 12B, auxiliary areas B1 and B2 are set, in the area around the non-walkable area, only in the region where the traffic line is likely to be interrupted.

In counting condition setter 24, the auxiliary area may be set according to the input operation by the user, but may be automatically set, in the walkable area, in the region where the counting area is not set.

As described above in the present embodiment, in counting condition setter 24, the auxiliary area is set in the walkable area separate from the counting area, and in correction area selector 28, the auxiliary area where the traffic line passes through immediately before entering the non-walkable area is set as the start point area, and the auxiliary area where the traffic line passes through immediately after the exit from the non-walkable area is set as the end point area, and then, the counting area existing on the avoidance route is estimated from the state of the traffic line in the start point area and the end point area. Therefore, it is possible to simply and accurately estimate the counting area existing on the avoidance route. In a case where the traffic line does not pass through the counting area immediately before entering the non-walkable area and immediately after the exit from the non-walkable area, it is possible to avoid the situation that the counting area existing on the avoidance route cannot be estimated.

Third Exemplary Embodiment

Figure 13:
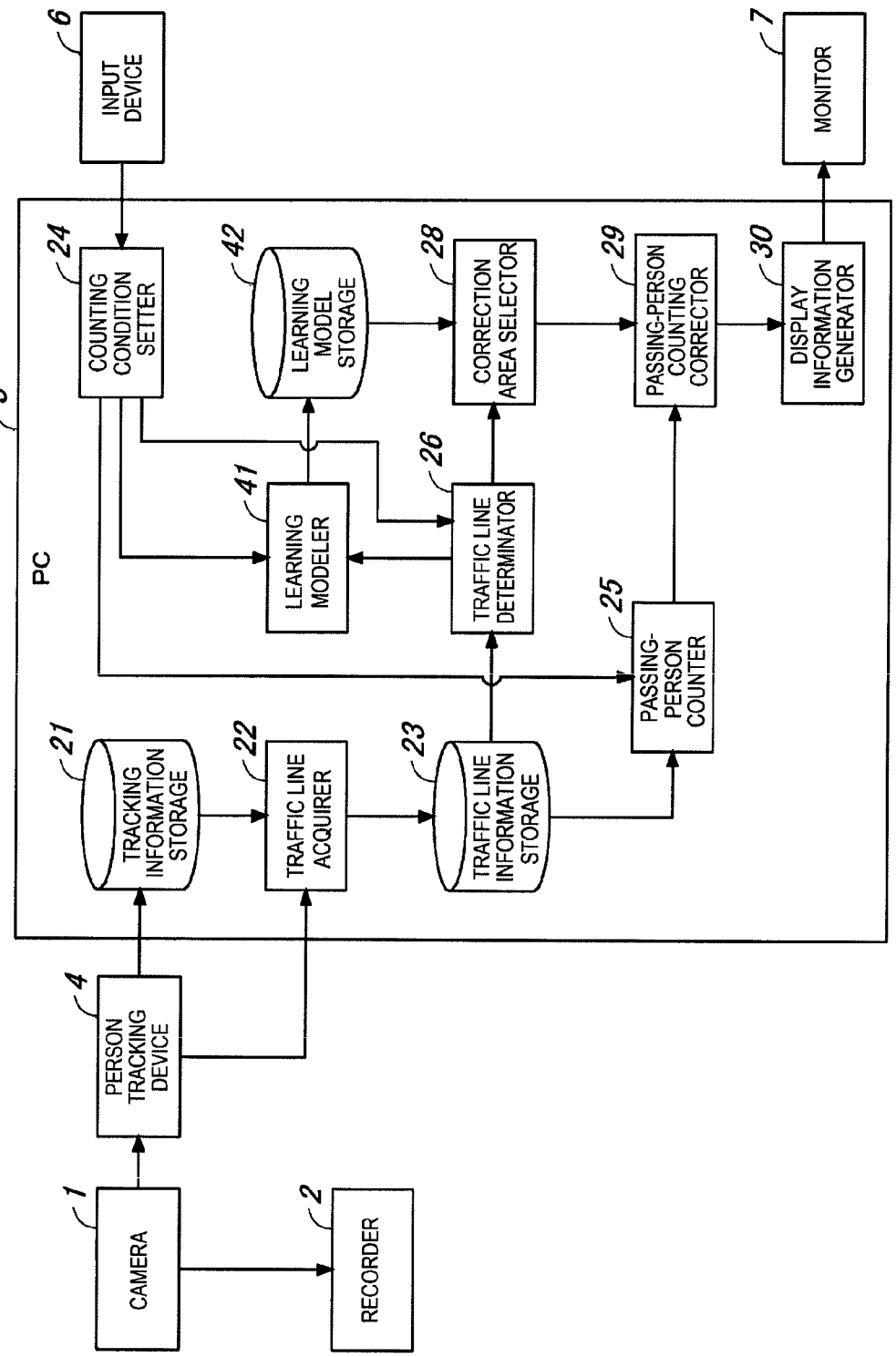
FIG. 13 is a functional block diagram illustrating a schematic configuration of a PC in the person counting system in a third embodiment.

Next, the third embodiment will be described. FIG. 13 is a functional block diagram illustrating a schematic configuration of PC 3 in the person counting system in the third embodiment. The points not described here are similar to those in the first embodiment.

In this third embodiment, learning modeler 41 and learning model storage 42 are provided.

In learning modeler 41, processing for collecting the normal traffic line that does not pass through the non-walkable area from the traffic lines acquired in the past by traffic line acquirer 22, and constructing a probability distribution (learning model) for estimating the avoidance route based on such normal traffic line, is performed. The probability distribution constructed in learning modeler 41 is stored in learning model storage 42. In correction area selector 28, the avoidance route is estimated from the state of the focused traffic line based on the probability distribution constructed in learning modeler 41, and then, the processing of estimating the counting area existing on the avoidance route is performed.

At the time when the probability distribution is constructed, a labeling is performed on the normal traffic line that does not pass through the non-walkable area, and in a case of describing with the example illustrated in FIG. 7, the probability distribution is constructed with the label being set as +1 (positive example) in the normal traffic line that directs counting area A5 from counting area A2 via counting areas A1 and A4, and the label being set as −1 (negative example) in the normal traffic line that directs counting area A5 from counting area A2 via counting areas A6 and A7. In this probability distribution, the information on at least one or more of the position of the start point area and the end point area, the moving direction of the person in the start point area and the end point area, and the elapsed time required for moving from the start point area to the end point area are set as the input information, and the avoidance route is set as the output information.

In the construction of the probability distribution, known statistical learning techniques such as a support vector machine or a boosting method may be used.

As described in the present embodiment, in learning modeler 41, the learning model is constructed from the normal traffic line that does not pass through the non-walkable area, and in correction area selector 28, the counting area existing on the avoidance route is estimated based on the learning model. Therefore, it is possible to accurately estimate the counting area existing on the avoidance route.

As described above, specific embodiments of the present invention are described. However, the embodiments are merely the examples and the present invention is not limited by those embodiments. In addition, each of the configuration elements of the person counting device, the person counting system, and the person counting method in the present invention illustrated in each of the embodiments described above is not necessarily required in its entirety, and can be appropriately selected without departing from the scope of the invention.

For example, in each embodiment described above, the store such as the convenience store is described as an example. However, the present invention is not limited to such the store, and each of the configuration elements of the person counting device, the person counting system, and the person counting method in the present invention can be widely applied to a place where the counting of the passing persons moving in the monitoring area is advantageous.

In addition, in each embodiment described above, as illustrated in FIG. 4 or the like, the counting area has a rectangular shape. However, the shape of the counting area is not limited to the rectangular shape, but may a circular or polygonal shape. In addition, the shape of the non-walkable area or the correction area is not limited to the rectangular shape, but may a circular or polygonal shape.

In addition, in each embodiment described above, as illustrated in FIG. 2, camera 1 is the omni-directional camera having an imaging range of 360° using a fish-eye lens. However, the camera may be a so-called box camera having a predetermined angle of view.

In addition, in each embodiment described above, person tracking device 4 is provided besides camera 1. However, as described above, it is also possible to configure as an imaging device with person tracking function by integrating all or part of the functions of person tracking device 4 to camera 1. In addition, person tracking device 4 may be configured using PC 3.

In addition, in each embodiment described above, PC 3 provided in the store performs the processing necessary for the person counting. However, the necessary processing may be performed by PC 11 provided in the headquarters or by cloud computer 12 that configures a cloud computing system. In addition, the necessary processing may shared with a plurality of information processing devices and may transfer the information among the plurality of information processing devices via communication media such as an IP network, LAN, and the like. In this case, the person counting system is configured using a plurality of information processing devices that share the needed processing.

In the configuration described above, among the processing tasks necessary for the person counting, at least the processing tasks in which the amount of calculation is large, for example, the person tracking processing or the traffic line acquisition processing, may be performed by a device such as PC 3 provided in the store. According to this configuration, since there remains a small amount of information data required for the remaining processing tasks, even though the remaining tasks may be performed by the information processing device provided at the position other than the store, for example, by PC 11 installed in the headquarters, the communication load can be reduced. Therefore, it is possible to make it easy to operate the system of the wide area network connection mode.

In addition, among the processing tasks necessary for the person counting, at least the processing tasks in which the amount of calculation is large, for example, the person tracking processing or the traffic line acquisition processing may be performed by cloud computer 12. According to this configuration, since there remains a small amount of information data required for the remaining processing tasks, a high speed information processing device is not necessary for the user side such as the store. Therefore, it is possible to reduce a user cost.

In addition, if all of the necessary processing tasks are performed by the cloud computer 12, or at least the a function of outputting the person counting result is given to cloud computer 12, the person counting result can be displayed on a mobile terminal such as a smart phone 13 in addition to PC 3 or PC 11 provided in the store or the headquarters. In this way, it is possible to check the person counting result at any place such a place where the user is visiting in addition to the store or the headquarters.

In addition, in each embodiment described above, various configurations, each of which has characteristics, are respectively illustrated. However, those configurations are not limited to the combinations illustrated in each embodiment, but the configurations illustrated in each embodiment may be appropriately combined.

The person counting device, the person counting system, and the person counting method according to the present invention are effective in decreasing the omission in counting that occurs in a case where the abnormal traffic lines passing through the non-walkable area are obtained and improving the accuracy of counting the number of persons passing through the counting area. Therefore, it is advantageous as the person counting device, the person counting system, and the person counting method that count the number of persons passing through the counting area set in the monitoring area based on the image obtained by imaging the monitoring area.

What is claimed is:

1. A person counting device comprising:
a processor; and
a memory that stores an instruction,
the device further comprising, as a configuration when the processor executes the instruction stored in the memory:
a detector configured to detect a person from an image of a monitoring area;
a counting condition setter that sets a non-walkable area and one or more counting areas in the monitoring area;
a traffic line acquirer that acquires a traffic line for each person detected from the image based on a history of positions of each said person;
a correction area selector configured to select, when the traffic line passes through the non-walkable area, a correction area from the one or more counting areas, and;
a passing-person counter that counts the number of persons having passed though the counting area based on the traffic lines passing through the counting area, wherein:
when the traffic line passes through the non-walkable area, the passing-person counter counts the number of persons by assuming that the traffic line passes through the correction area instead of the non-walkable area.

2. The person counting device of claim 1,
wherein the traffic line acquirer acquires a single traffic line by connecting a plurality of separate traffic lines, when the plurality of separate traffic lines are recognized for a single person.

3. The person counting device of claim 1,
wherein the correction area selector is further configured to select the correction area according to an estimation regulation set in advance.

4. The person counting device of claim 3, wherein the estimation regulation defines which of the counting area is to be selected as the correction area by positional relationships among the counting areas and the non-walkable area.

5. The person counting device of claim 1,
wherein the correction area selector is further configured to:
estimate an avoidance route which passes through a start point area, at least one counting area and an end point area, without passing through the non-walkable area, the start point area being an area where the traffic line enters in to non-walkable area and the end point area being an area where the traffic line exits from the non-walkable area, and
select the at least one counting area passed through by the avoidance route as the correction area.

6. The person counting device of claim 5,
wherein the correction area selector is further configured to estimate the avoidance route based on at least one of the state of the traffic line at the start point area and the state of the traffic line at the end point area.

7. The person counting device of claim 5, wherein:
the counting condition setter sets one or more auxiliary areas at areas other than the counting areas and the non-walkable area, wherein, for the auxiliary areas, the position of persons are tracked but the number of persons is not counted, and
when the traffic line enters into or exits from the non-walkable area at the auxiliary area, the auxiliary area is used as the start point area or the end point area.

8. The person counting device of claim 6,
wherein the state of the traffic line at the starting point area is a direction of the traffic line entering into the non-walkable area, and wherein the state of the end point area is a direction of the traffic line exiting from the non-walkable area.

9. The person counting device of claim 6,
wherein the state of the traffic line at the starting point area and the state of the end point area is an elapsed time passed while the person moves from the start point area to the end point area.

10. The person counting device of claim 1, further comprising, as a configuration when the processor executes the instruction stored in the memory:
a learning modeler that collects data of a normal traffic line that does not pass through the non-walkable area, and constructs a learning model based on the data of the normal traffic line, wherein the correction area selector selects the correction area based on the learning model constructed by the learning modeler.

11. A person counting system comprising:
a camera that images the monitoring area; and
a plurality of information processors,
wherein any one of the plurality of information processors includes a processor and a memory that stores an instruction, and an information processor of the any one of the plurality of information processors further includes, as a configuration when the processor executes the instruction stored in the memory:
a person tracker that detects a person from the image by the camera and acquires position information;
a detector configured to detect the person from an image of a monitoring area;
a counting condition setter that sets a non-walkable area and one or more counting areas in the monitoring area;
a traffic line acquirer that acquires a traffic line for each person based on the position information acquired by the person tracker based on a history of positions of each said person;
a correction area selector configured to select, when the traffic line passes through the non-walkable area, a correction area from the one or more counting areas, and;
a passing-person counter that counts the number of persons having passed though the counting area based on the traffic lines passing through the counting area, wherein:

when the traffic line passes through the non-walkable area, the passing-person counter counts the number of persons by assuming that the traffic line passes through the correction area instead of the non-walkable area.

12. A person counting method comprising, when a processor of an information processing device executes instructions stored in a memory of the information processing device:

detecting a person from an image of a monitoring area;

setting a non-walkable area and one or more counting areas in the monitoring area;

acquiring a traffic line for each person from the detected from the image based on a history of positions of each said person;

selecting, when the traffic line passes through the non-walkable area, a correction area from the one or more counting areas, counting the number of persons having passed though the counting area based on the traffic lines passing through the counting area; and counting, when the traffic line passes through the non-walkable area, the number of persons by assuming that the traffic line passes through the correction area instead of the non-walkable area.

\* \* \* \* \*